United States Patent
Imanishi et al.

(10) Patent No.: US 10,186,722 B2
(45) Date of Patent: Jan. 22, 2019

(54) FUEL CELL SYSTEM, MOVABLE BODY, AND CONTROL METHOD

(71) Applicant: TOYOTA JIDOSHA KABUSHIKI KAISHA, Toyota-shi, Aichi-ken (JP)

(72) Inventors: Hiroyuki Imanishi, Toyota (JP); Tomohiro Ogawa, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 431 days.

(21) Appl. No.: 14/940,426

(22) Filed: Nov. 13, 2015

(65) Prior Publication Data
US 2016/0141683 A1    May 19, 2016

(30) Foreign Application Priority Data

Nov. 14, 2014  (JP) ................................. 2014-231954

(51) Int. Cl.
| | | |
|---|---|---|
| H01M 8/04746 | (2016.01) | |
| H01M 8/04089 | (2016.01) | |
| H01M 8/04223 | (2016.01) | |
| H01M 8/043 | (2016.01) | |
| B60L 3/00 | (2006.01) | |
| B60L 11/18 | (2006.01) | |

(52) U.S. Cl.
CPC ....... *H01M 8/04753* (2013.01); *B60L 3/0053* (2013.01); *B60L 11/1883* (2013.01); *H01M 8/043* (2016.02); *H01M 8/04089* (2013.01); *H01M 8/04223* (2013.01); *H01M 2250/20* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| | | |
|---|---|---|
| 2004/0089829 A1 | 5/2004 | Ludwig et al. |
| 2007/0048565 A1 | 3/2007 | Junge et al. |
| 2014/0095055 A1 | 4/2014 | Kim et al. |
| 2014/0295305 A1 | 10/2014 | Wake et al. |
| 2014/0295306 A1 | 10/2014 | Kikuchi et al. |

FOREIGN PATENT DOCUMENTS

| | | |
|---|---|---|
| JP | 2010-177111 | 8/2010 |
| JP | 2011-181509 | 9/2011 |
| JP | 2013-198295 | 9/2013 |
| JP | 2014-192046 | 10/2014 |
| JP | 2014-193050 | 10/2014 |
| KR | 10-2014-0042218 A | 4/2014 |

*Primary Examiner* — Sarah A. Slifka
(74) *Attorney, Agent, or Firm* — Finnegan, Henderson, Farabow, Garrett & Dunner, LLP

(57) ABSTRACT

Disclosed is a technology for ensuring the safety of a vehicle on which a fuel cell is mounted and the convenience of a user.
In a fuel cell system which is able to be mounted on a movable body, it is determined whether or not the movement of the movable body is stopped and the fuel cell system is operated when an opening instruction for opening a filling port for filling a fuel gas storage portion with fuel gas is received. When it is determined that the movement of the movable body is stopped and the fuel cell system is operated, a main stop valve controlling the supply of the fuel gas to the cell stack from the fuel gas storage portion is closed, and then the filling port is opened.

5 Claims, 2 Drawing Sheets

FUEL CELL SYSTEM, MOVABLE BODY, AND CONTROL METHOD

BACKGROUND OF THE INVENTION

Field of the Invention

The present invention relates to a fuel cell system, a movable body, and a control method.

Background Art

In a vehicle such as an electric vehicle or a hybrid vehicle, a fuel cell which is a power source of the vehicle is mounted. The fuel cell includes an anode side to which fuel gas including hydrogen gas is supplied, and a cathode side to which air is supplied. The fuel gas is supplied to the anode side by reducing the pressure of the hydrogen gas which fills a hydrogen tank at a high pressure to a desired pressure using a pressure reducing valve. On the other hand, the temperature of the air is adjusted to be a temperature at which high power generation efficiency is obtained through a heat exchanger or the like and the air is humidified, and then the air is supplied to the cathode side of a fuel cell stack. In Patent Document 1, a technology regarding a vehicle on which a fuel cell is mounted is disclosed.

CITATION LIST

Patent Document

[Patent Document 1] JP2011-181509 A

SUMMARY OF THE INVENTION

The fuel cell generates power by receiving supply of the fuel gas, and thus it is necessary to refill the vehicle on which the fuel cell is mounted with the fuel gas in order to continue driving. In addition, it is desirable that safety is sufficiently ensured at the time of refilling the fuel cell with the fuel gas. On the other hand, even though safety is ensured, it is not preferable for a user of the vehicle on which the fuel cell is mounted to feel inconvenience, and thus it is necessary to consider the convenience of the user in order to ensure safety.

The present invention is made in consideration of the circumstances described above. An object of the present invention is to provide a technology for ensuring the safety of a vehicle on which a fuel cell is mounted and the convenience of a user.

A fuel cell system according to an aspect of the present invention which is able to be mounted on a movable body includes a cell stack including a plurality of single cells generating power by receiving supply of fuel gas and oxidizing gas; a fuel gas storage portion storing the fuel gas; a supply path supplying the fuel gas to the cell stack from the fuel gas storage portion; a main stop valve disposed in the supply path and controlling the supply of the fuel gas to the cell stack; a filling port for filling the fuel gas storage portion with the fuel gas; and a controller controlling the filling port to be opened after the main stop valve is closed when an instruction for opening the filling port is received at the time that a movement of the movable body is stopped and the fuel cell system is operated.

A movable body according to another aspect of the present invention includes a fuel cell system mounted thereon, and the fuel cell system includes a cell stack including a plurality of single cells generating power by receiving supply of fuel gas and oxidizing gas, a fuel gas storage portion storing the fuel gas, a supply path supplying the fuel gas to the cell stack from the fuel gas storage portion, a main stop valve disposed in the supply path and controlling the supply of the fuel gas to the cell stack, a filling port for filling the fuel gas storage portion with the fuel gas, and a controller controlling the filling port to be opened after the main stop valve is closed when an instruction for opening the filling port is received at the time that a movement of the movable body is stopped and the fuel cell system is operated.

A control method according to still another aspect of the present invention performed in a fuel cell system which is able to be mounted on a movable body includes a step of determining whether or not the movable body is stopped and the fuel cell system is operated when an opening instruction for opening a filling port for filling a fuel gas storage portion with fuel gas is received; and a step of opening the filling port after a main stop valve controlling supply of the fuel gas to a cell stack from the fuel gas storage portion is closed when it is determined that a movement of the movable body is stopped and the fuel cell system is operated.

According to the present invention, it is possible to provide a technology for ensuring the safety of a vehicle on which a fuel cell is mounted and the convenience of a user.

DESCRIPTION OF THE PREFERRED EMBODIMENTS

Hereinafter, an embodiment of the present invention will be described in detail with reference to the drawings. However, the range of the present invention is not limited thereto.

[Configuration of Fuel Cell System]

Figure 1:
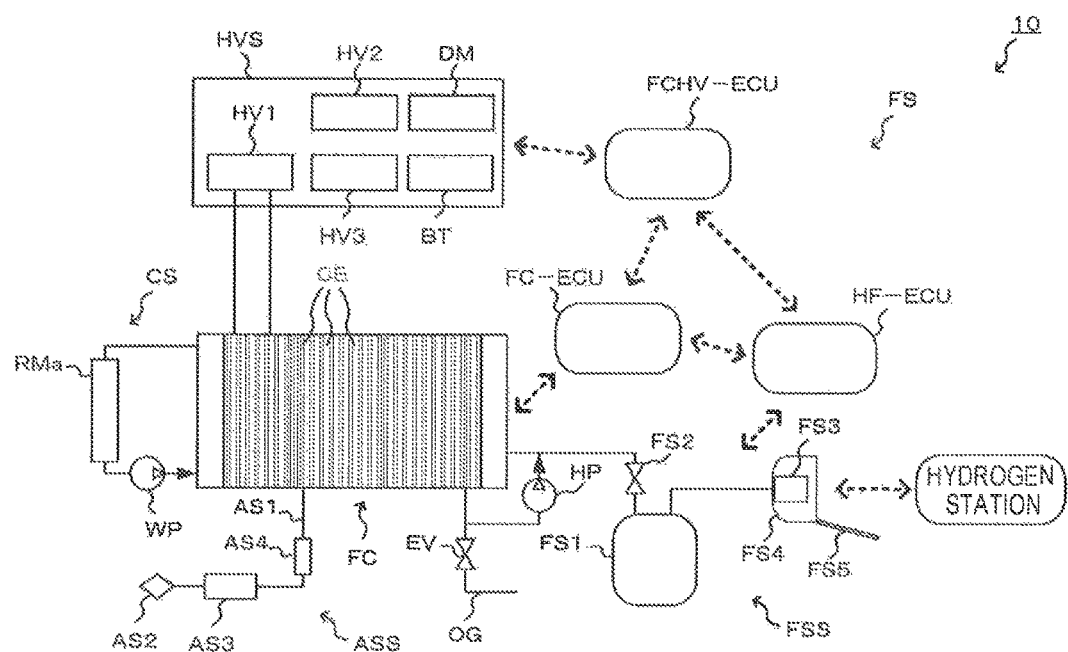
FIG. 1 is a diagram illustrating a schematic configuration of a fuel cell system according to one embodiment.

In one embodiment of the present invention, an example of a schematic configuration of a fuel cell system FS mounted on a fuel cell vehicle will be described with reference to FIG. 1. Furthermore, the configuration described below with reference to FIG. 1 is merely a main configuration of the fuel cell system FS, and the configuration of the fuel cell system FS is able to include configurations other than the configuration described below. The fuel cell system FS is mounted on a fuel cell vehicle 10, and functions as an on-vehicle power supply system of the fuel cell vehicle 10. The fuel cell system FS is able to be mounted on a vehicle (a movable body) such as a fuel cell vehicle (FCV), an electric vehicle and a hybrid vehicle.

The fuel cell system FS includes a fuel cell FC, an oxidation gas supply system ASS, a fuel gas supply system FSS, a driving system HVS, and a cooling system CS. In addition, the fuel cell system FS includes a controller FCHV-ECU, a controller FC-ECU, and a controller HF-ECU as an engine controller.

The oxidation gas supply system ASS is a system for supplying air as oxidizing gas (oxidation gas) to the fuel cell FC (a cell CE). The fuel gas supply system FSS is a system for supplying hydrogen gas as fuel gas to the fuel cell FC (the cell CE). The driving system HVS is a system driving a driving motor DM or the like by supplying power thereto, and is a system configuring a hybrid system. The cooling system CS is a system for cooling the fuel cell FC.

The fuel cell system FS will be described in detail. The fuel cell FC includes a proton exchange membrane cell stack in which a plurality of cells CE (a single cell (a power generation body) including an anode, a cathode, and an electrolyte) is stacked in series. In the fuel cell FC, an oxidation reaction of Equation (1) occurs in an anode and a reduction reaction of Equation (2) occurs in a cathode, in an operation at the time of normal power generation. In the entire fuel cell FC, an electromotive reaction of Equation (3) occurs.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

Further, the fuel cell system FS includes a hydrogen pump HP in a region connecting the fuel cell FC and the fuel gas supply system FSS.

The fuel gas supplied to the fuel cell FC contributes to an electromotive reaction in the fuel cell FC, and is discharged from the fuel cell FC as off-gas. A part of the fuel off-gas discharged from the fuel cell FC is recycled by the hydrogen pump HP, and is resupplied to the fuel cell FC along with the fuel gas which is supplied from the fuel gas supply system FSS. In addition, a part of the fuel off-gas from the fuel cell FC is discharged along with oxidation off-gas through a fuel off-gas flow path according to the operation of an exhaust and drain valve EV disposed in the fuel off-gas flow path.

The exhaust and drain valve EV is operated according to the control of the controller FC-ECU, and is a valve for discharging the fuel off-gas including impurities in the circulation flow path, and moisture to the outside. By opening the exhaust and drain valve EV, the concentration of the impurities in the fuel off-gas in the circulation flow path decreases, and thus it is possible to increase the concentration of hydrogen in the fuel off-gas circulating through a circulation system.

The fuel off-gas discharged through the exhaust and drain valve EV is exhausted by being mixed with the oxidation off-gas flowing through an oxidation off-gas flow path OG.

Subsequently, the fuel gas supply system FSS will be described. The fuel gas supply system FSS mainly includes a high pressure hydrogen tank FS1, a main stop valve FS2, and a filling port FS3.

The high pressure hydrogen tank FS1 is a storage portion storing the hydrogen gas (the fuel gas) at a high pressure (for example, 35 MPa to 70 MPa).

The main stop valve FS2 is an opening and closing valve performing opening and closing with respect to a fuel gas supply pipe which is connected from the high pressure hydrogen tank FS1 to the fuel cell FC according to the control of the controller HF-ECU. According to the opening and closing, it is possible to block or release the flow of fuel gas into the fuel cell FC from the high pressure hydrogen tank FS1.

The filling port FS3 is a filling port for filling the high pressure hydrogen tank FS1 with the fuel gas. The filling port FS3 is disposed in a lid box FS4. In the lid box FS4, a lid FS5 which is able to be rotated such that the inner portion of the lid box FS4 is released or closed is disposed.

When the lid FS5 is closed, the filling port FS3 is shielded from the outside. In addition, when the lid FS5 is opened, the filling port FS3 is exposed to the outside. At this time, a hydrogen filling nozzle (not illustrated) of a hydrogen station is able to be inserted into the filling port FS3. In order for a user to fill the fuel gas storage portion with the fuel gas, when the hydrogen filling nozzle of the hydrogen station is inserted into the filling port FS3 exposed to the outside, communication is performed between the fuel cell system FS and the hydrogen station through the filling port FS3 and the hydrogen filling nozzle. As a result of this communication, when it is determined that the filling the fuel gas storage portion with the fuel gas is able to be performed, a valve (not illustrated) of a filling path between the high pressure hydrogen tank FS1 and the filling port FS3 is opened, and the filling the fuel gas storage portion with the fuel gas starts.

The opening and closing of the lid FS5 (that is, opening/closing of the filling port FS3) is performed by the control of the controller FCHV-ECU, the controller HF-ECU, and the like according to an instruction from the user. A control method of the opening and closing of the lid FS5 due to the controller HF-ECU will be described in detail.

Subsequently, the oxidation gas supply system ASS, the driving system HVS, and the cooling system CS will be described. Only a main configuration of these systems will be simply described. The oxidation gas supply system ASS includes an air cleaner AS2, an air compressor AS3, and an intercooler AS4 which are respectively disposed in the oxidation gas flow path AS1. The driving system HVS includes a fuel cell boosting converter HV1, a battery boosting converter HV2, a traction inverter HV3, a secondary battery BT, and a driving motor DM. The cooling system CS includes a main radiator RM, and a water pump WP.

Subsequently, the engine controller will be described. The controller FCHV-ECU, the controller FC-ECU, and the controller HF-ECU are computer systems respectively including a CPU, a ROM, a RAM, an input and output interface, and the like.

The controller FCHV-ECU performs control of the entire fuel cell system FS, driving control, power distribution control, and the like. For example, when an activation signal IG output from an ignition switch is received, the controller FCHV-ECU starts the operation of the fuel cell system FS (activates the fuel cell system FS). After that, the controller FCHV-ECU obtains the power required for the entire fuel cell system FS on the basis of an accelerator opening signal ACC output from an accelerator sensor, a vehicle speed signal VC output from a vehicle speed sensor, and the like. The power required for the entire fuel cell system FS is the total value of vehicle traveling power and auxiliary machine power.

In addition, the controller FCHV-ECU outputs each alternating-current voltage command value of an U phase, a V phase, and a W phase, for example, as a switching command to the traction inverter such that a target torque is obtained according to an accelerator opening, and controls the output torque of the driving motor DM, and the number of rotations.

Further, when a signal for stopping the operation of the fuel cell system FS is received, the controller FCHV-ECU starts processing for stopping the operation of the fuel cell system FS. As the processing for stopping the operation of the fuel cell system FS, for example, processing such as stopping the supply of the fuel gas and the oxidizing gas to the fuel cell FC (the cell CE) (including closing the main stop valve FS2), exhausting gas and draining water in the fuel cell FC (the cell CE), adjusting the pressure in the fuel cell FC, and cooling the fuel cell FC is included.

The controller FC-ECU performs power generation control of the fuel cell FC, control of on-vehicle auxiliary machines, and the like. For example, the controller FC-ECU controls the oxidation gas supply system ASS and the fuel gas supply system FSS such that the power generation amount of the fuel cell FC is coincident with target power, and controls an operation point of the fuel cell FC (an output voltage, and an output current) by controlling a FC voltage booster FDC. In addition, the controller FC-ECU controls the cooling system CS such that the fuel cell FC is at a suitable temperature.

The controller HF-ECU performs control relevant to the filling, supplying, and the like of the fuel gas. For example, the controller HF-ECU performs control of the communication between the fuel cell system FS and the hydrogen station through the filling port FS3 and the hydrogen filling nozzle, and control of whether the lid FS5 is opened or closed (that is, of whether the filling port FS3 is opened or closed) and/or of whether the lid FS5 is able to be opened or closed.

[Control of Fuel Cell System]

A control flow of the processing performed by the fuel cell system FS will be described with reference to FIG. 2. A control flow of the processing relevant to the opening of the filling port FS3 is illustrated.

First, in Step S21, the controller FCHV-ECU determines whether or not an opening instruction for opening the filling port FS3 (that is, an instruction for opening the lid FS5) is received. The opening instruction for opening the filling port FS3, for example, is performed through the operation of switches by the user of the movable body on which the fuel cell system FS is mounted. When it is determined that the instruction is received, the processing proceeds to Step S22.

In Step S22, the controller FCHV-ECU determines whether or not the movable body on which the fuel cell system FS is mounted (for example, the fuel cell vehicle) is stopped (parked). For example, the controller FCHV-ECU detects that the position of a shift lever provided in the movable body is P (parking), that an emergency brake is operated, or that the vehicle speed of the movable body is zero, and thus determines that the movable body is stopped. It is possible to determine whether or not the movable body is stopped according to whether or not a wheel is rotated. When it is determined that the movable body is stopped, the processing proceeds to Step S23. When it is determined that the movable body is not stopped, the processing proceeds to S26, and the opening instruction for opening the filling port FS3 is cancelled (that is, the filling port FS3 is not opened).

In Step S23, the controller FCHV-ECU determines whether or not the fuel cell system FS is operated (that is, a state where the power is generated or the power is able to be generated such as during the operation or activation). When it is determined that the fuel cell system FS is activated, the processing proceeds to Step S24. When it is determined that the fuel cell system FS is not operated, the processing proceeds to Step S25.

In Step S24, the controller FCHV-ECU closes the main stop valve FS2. The flow of the fuel gas between the high pressure hydrogen tank FS1 and the fuel cell FC is blocked due to the closing of the main stop valve FS2.

In addition, in Step S24, the controller FCHV-ECU may close the main stop valve FS2, and may start processing for ending (stopping) the operation of the fuel cell system FS. As the processing for stopping the operation of the fuel cell system FS, for example, processing such as stopping the supply of the fuel gas and the oxidizing gas to the fuel cell FC (the cell CE), exhausting gas and draining water in the fuel cell FC (the cell CE), adjusting the pressure in the fuel cell FC, and cooling the fuel cell FC is included. The processing for stopping the operation of the fuel cell system FS is identical to the processing which starts at the time of receiving the signal for stopping the operation of the fuel cell system FS as described above (normal stop processing of the fuel cell system FS).

When the main stop valve FS2 is closed, the fuel gas is not supplied to the fuel cell FC (the cell CE), and thus when the power generation is required at the time that the main stop valve FS2 is closed, fuel gas shortage (hydrogen shortage) occurs. However, in Step S24, the main stop valve FS2 is closed, and the operation of the fuel cell system FS is stopped, and thus it is possible to prevent the fuel gas shortage.

Furthermore, the processing of stopping the activation of the fuel cell system FS in Step S24 is able to omit a part of the normal stop processing of the fuel cell system FS. For example, it is possible to omit the processing of exhausting gas and/or or draining water in the fuel cell FC (the cell CE). By omitting a part of the processing in this way, it is possible to complete the stopping of the activation of the fuel cell system FS earlier than in the normal stop processing.

In Step S25, the controller FCHV-ECU (or the controller HF-ECU) opens the filling port FS3 (that is, opens the lid FS5). Alternatively, the controller FCHV-ECU (or the controller HF-ECU) sets the filling port FS3 to be in a state where the filling port FS3 is able to be opened. By opening the filling port FS3, it is possible for the user to insert the hydrogen filling nozzle of the hydrogen station into the filling port FS3.

As described above, according to this embodiment, the controller FCHV-ECU opens the filling port FS3 after the main stop valve FS2 is closed when the instruction for opening the filling port FS3 is received at the time that the movement of the movable body on which the fuel cell system FS is mounted is stopped and the fuel cell system FS is operated. In addition, the opening instruction for opening the filling port FS3 is cancelled at the time that the movable body is moved.

Accordingly, even when the instruction for opening the filling port FS3 is received, the filling port FS3 is not opened at the time that the movable body is moved, and thus it is possible to ensure the safety of the movable body (the vehicle) on which the fuel cell FC is mounted.

In addition, when the instruction for opening the filling port FS3 is received at the time that the movable body is stopped (parked), the filling port FS3 is opened after the main stop valve FS2 is closed at the time that the fuel cell system FS is operated. For this reason, the user does not feel a sense of discomfort that the filling port FS3 is not able to be opened even if the user tries to open the filling port FS3. That is, the opening instruction for opening the filling port FS3 received at the time that the fuel cell system FS is operated is more convenient for the user compared to a case where the opening instruction is consistently cancelled.

In addition, when the opening instruction for opening the filling port FS3 is received at the time that the movable body is stopped (parked) and the fuel cell system FS is activated, the main stop valve FS2 is closed and the activation of the fuel cell system FS is stopped, and then the filling port FS3 is able to be opened. As a result thereof, it is possible to prevent a hydrogen shortage which occurs when the main stop valve FS2 is closed without stopping the activation of the fuel cell system FS.

Figure 2:
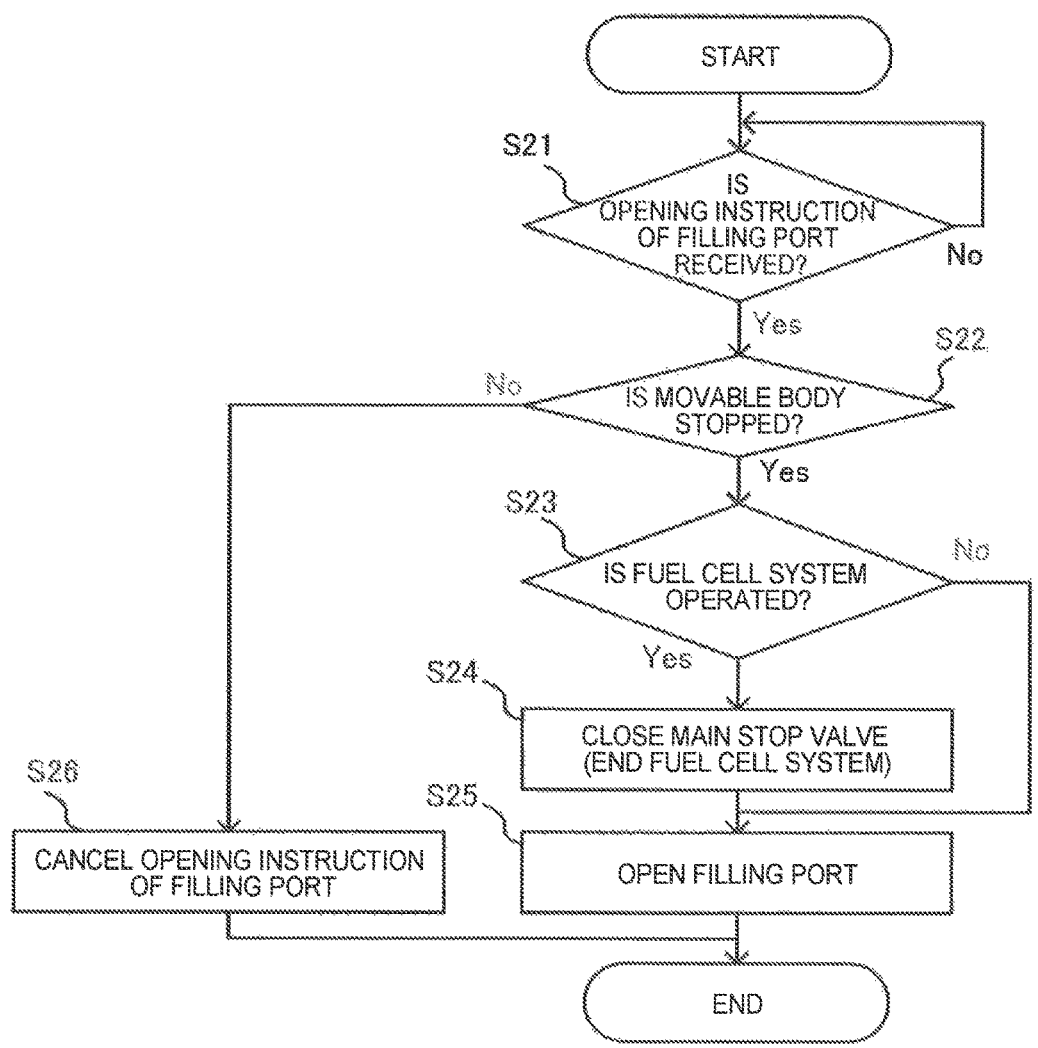
FIG. 2 is a flowchart illustrating a flow of control of the fuel cell system according to one embodiment.

Further, the processing of stopping the activation of the fuel cell system FS in Step S24 of FIG. 2 is able to omit a part of the normal stop processing of the fuel cell system FS. By omitting a part of the processing in this way, it is possible to stop the activation of the fuel cell system FS earlier than in the normal stop processing of the fuel cell system FS, and thus it is possible to open the filling port FS3 earlier than in a case of waiting for the end of the normal stop processing.

In addition, it is considered that when the user opens the filling port FS3 in order to fill the fuel cell with the fuel gas, the user is highly likely to start the operation of the vehicle immediately after the filling ends. Accordingly, it is considered that even when a part of the processing such as exhausting gas and draining water in the fuel cell FC (the cell CE) is omitted in the processing of stopping the activation of the fuel cell system FS in Step S24, the fuel cell FC rarely deteriorates.

EXPLANATION OF REFERENCES

AS1: oxidation gas flow path
AS2: air cleaner
AS3: air compressor
AS4: intercooler
ASS: oxidation gas supply system
BT: secondary battery
CE: cell
CS: cooling system
DM: driving motor
FCHV-ECU: controller
FC-ECU: controller
HF-ECU: controller
EV: exhaust and drain valve
FC: fuel cell
FS: fuel cell system
FS1: high pressure hydrogen tank
FS2: main stop valve
FS3: filling port
FS4: lid box
FS5: lid
FSS: fuel gas supply system
HP: hydrogen pump
HVS: driving system
RM: main radiator
WP: water pump

What is claimed is:

1. A fuel cell system which is able to be mounted on a movable body, comprising:
    a cell stack including a plurality of single cells generating power by receiving supply of fuel gas and oxidizing gas;
    a fuel gas storage portion storing the fuel gas;
    a supply path supplying the fuel gas to the cell stack from the fuel gas storage portion;
    a main stop valve disposed in the supply path and controlling the supply of the fuel gas to the cell stack;
    a filling port for filling the fuel gas storage portion with the fuel gas; and
    a controller which, when an instruction for opening the filling port is received, determines whether or not the movable body is stopped, wherein, when it is determined that the movable body is not stopped, the controller is configured to perform controlling to cancel the instruction, and wherein when it is determined that the movable body is stopped, the controller is configured to further determine whether or not the fuel cell system is operated, and wherein, when it is further determined that the fuel cell system is operated, the controller is configured to control the filling port to be opened after the main stop valve is closed.

2. The fuel cell system according to claim 1, wherein the controller performs end processing with respect to the operation of the fuel cell system and closes the main stop valve when the instruction for opening the filling port is received at the time that a movement of the movable body is stopped and the fuel cell system is operated.

3. The fuel cell system according to claim 2, wherein the end processing of the operation of the fuel cell system when the instruction for opening the filling port is received at the time that the movement of the movable body is stopped and the fuel cell system is operated does not include at least a part of normal end processing of the operation of the fuel cell system.

4. The fuel cell system according to claim 3, wherein at least the part of the processing includes at least any one of exhaust processing and drain processing of the cell stack.

5. A movable body on which a fuel cell system is mounted,
    wherein the fuel cell system includes
    a cell stack including a plurality of single cells generating power by receiving supply of fuel gas and oxidizing gas,
    a fuel gas storage portion storing the fuel gas,
    a supply path supplying the fuel gas to the cell stack from the fuel gas storage portion,
    a main stop valve disposed in the supply path and controlling the supply of the fuel gas to the cell stack,
    a filling port for filling the fuel gas storage portion with the fuel gas, and
    a controller which, when an instruction for opening the filling port is received, determines whether or not the movable body is stopped, wherein, when it is determined that the movable body is not stopped, the controller is configured to perform controlling to cancel the instruction, and wherein when it is determined that the movable body is stopped, the controller is configured to further determine whether or not the fuel cell system is operated, and wherein, when it is further determined that the fuel cell system is operated, the controller is configured to control the filling port to be opened after the main stop valve is closed.

* * * * *